Nov. 14, 1967     H. C. ANDERSON     3,352,704
MICROWAVE PROCESS AND APPARATUS
Original Filed April 10, 1961

INVENTOR
HAROLD C. ANDERSON

BY  *Alfred B. Levine*
ATTORNEY

United States Patent Office 3,352,704
Patented Nov. 14, 1967

3,352,704
MICROWAVE PROCESS AND APPARATUS
Harold C. Anderson, Rockville, Md., assignor to Litton Systems, Inc., Silver Spring, Md.
Original application Apr. 10, 1961, Ser. No. 101,741, now Patent No. 3,281,856, dated Oct. 25, 1966. Divided and this application July 2, 1964, Ser. No. 380,014
7 Claims. (Cl. 117—36.8)

ABSTRACT OF THE DISCLOSURE

A spin resonant recording medium for microwaves characterized by changing the physical shape or configuration of its surface in response to absorbed energy.

---

Figure 1:
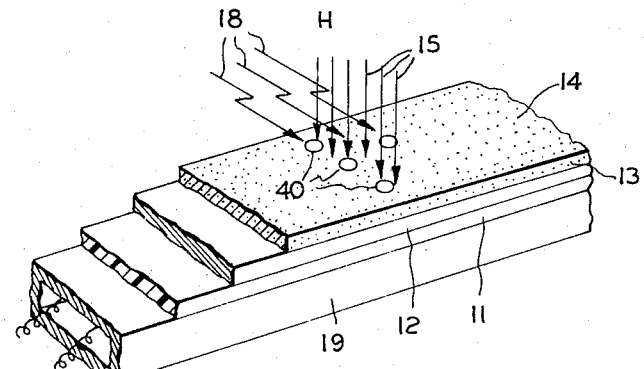

This invention generally relates to the recording of radiant microwave radio beams by spin resonance technology and is particularly concerned with the recording medium for recording of the beam in the form of deformed images or patterns over the surface of heat sensitive plastic materials. This is a division of pending application Ser. No. 101,741 filed Apr. 10, 1961, now Patent No. 3,281,856.

In an earlier application of the same assignee, Ser. No. 59,342, filed Sept. 29, 1960, now Patent No. 3,238,511, there is disclosed processes for directly recording a radiant microwave intelligence beam in the form of detectable images on a tape or other record member by employing spin resonance technology. In the processes disclosed, the microwave beam is recorded by presensitizing a spin resonance material into absorptive relation with the frequencies of the beam whereby the energy being absorbed varies the characteristics of the material or its surroundings in such manner as to produce a reproduceable pattern of the beam characteristics. In another prior application, Ser. No. 118,407, filed June 20, 1961, now Patent No. 3,158,678, there is disclosed other recording processes wherein the radiant microwave beam is recorded in the form of a visible color density image by employing the energy absorbed from the beam to vary the color characteristics of certain chemical or physical materials.

According to the present invention, there is provided a recording medium for permitting the direct recording of radiant microwave beams in permanent or semi-permanent physical image form that differ from those of the prior applications by providing a recording in the form of a physical deformation pattern of the beam over the surface of certain plastic materials. Very generally, the recording medium employed according to the invention includes a means, such as a layer of spin resonant material, for directly converting the energy of the radiant beam into a spatially dispersed heat pattern image of the intelligence and a second means, such as a layer of thermoplastic material in heat transferring relationship with the first layer, that responds to the heat image to provide a pattern of ripples, indentations, or other physical changes in the surface of the material according to the intelligence characteristics of the microwave beam.

In one preferred embodiment of the invention, the heat pattern being obtained from the spin resonance absorption phenomena is applied directly to the surface of a heat sensitive thermoplastic material to raise the temperature of the material to above its critical temperature. This heating of the plastic maerial in the desired surface pattern directly produces a change in the state of the material to vary the surface finish of the material and capture and record the heat image in permanent or semi-permanent form. According to a second preferred embodiment of the invention, the heat image is applied to a thermoplastic material to produce a heat softened pattern over the surface thereof, and by means of additional steps, the thermoplastic material is also uniformly stressed by means such as an electrostatic field. As a result, only the heat softened areas over the surface of the material are distorted or deformed by the stressing force to provide a very pronounced pattern or physical image corresponding to the heat image, whereas those areas over the surface that have not been heated remain undisturbed and in their original surface configuration.

It is accordingly a principal object of the invention to provide a recording medium for directly converting a time variable radiant microwave intelligence beam into a deformed surface image of the beam on a thermoplastic material.

A further object is to provide such a recording medium for converting a broad frequency band of such microwave beams into frequency spectrum images in permanent or semi-permanent form.

A still further object is to provide such a recording medium employing spin resonance materials.

Still another object is to provide such a recording medium wherein the signal is recorded as embossed or deformed surface patterns along a thermoplastic record member.

A still further object of the invention is to provide improved recording tapes or record means for radiant microwave beam recording.

Figure 2:
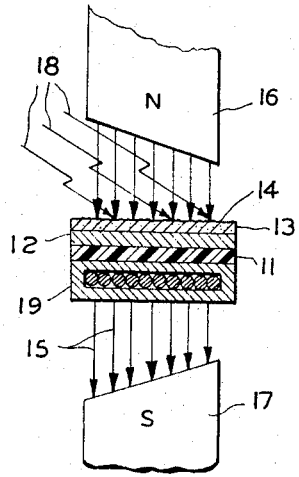
Figure 3:
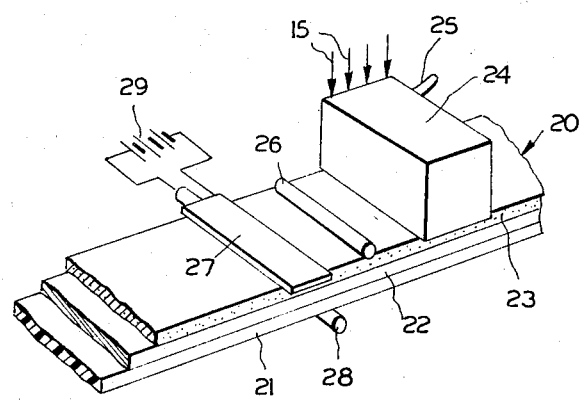
Figure 4:
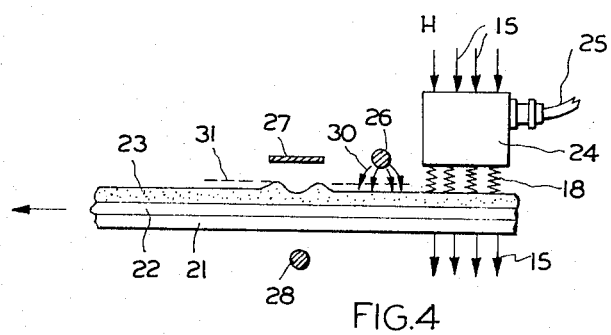

Other objects and many additional advantages will be more readily understood by those skilled in the art after a detailed consideration of the following specification, taken with the accompanying drawings, wherein:

FIG. 1 is a perspective view generally illustrating one preferred recording tape and the manner of applying a magnetic field in a radio beam to effect the recording thereof, FIG. 2 is a perspective view of the tape of FIG. 1 and further illustrating the nonuniform magnet means for enabling spectral image recording on the tape, FIG. 3 is a perspective view illustrating a second embodiment of the invention, and FIG. 4 is a sectional view taken lengthwise along the tape in FIG. 3.

Referring now to the drawings, for a detailed consideration of one preferred embodiment of the invention, there is generally illustrated in FIGS. 1 and 2, a preferred recording tape construction 10 together with recording means for directly converting a time variable microwave beam 18 into a physically deformed surface pattern or embossing along the length and width of the tape or other record member 10.

As is generally shown, the tape or record member is comprised of a base supporting layer 11 of Mylar or other suitable base material, either rigid or flexible, over the surface of which is provided a coating or impregnation of a spin resonance material 12, containing a considerable number of free or uncoupled electrons, or other subatomic particles therein. A third or upper layer 13 on the tape is preferably comprised of a coating or impregnation of a thermoplastic material, such as a wax, or other suitable thermoplastic that is characterized by providing a physical change in its surface condition upon being subjected to a temperature exceeding its critical temperature, as will be discussed more fully hereafter. The recording tape 10 is heated and maintained at a temperature just under its critical temperature by a regulated external heating source generally indicated as 19.

A frame or region on the record member to receive a recording of the microwave beam is subjected to a high intensity static magnetic field 15, as indicated by the arrow lines numbered 15, by such means as being introduced between the opposing poles 16 and 17 of a permanent magnet or electromagnet of suitable strength. This static magnetic field 15 uniformly orients the magnetic dipoles in the spin resonance material and serves to "tune" these dipoles into energy absorptive relationship with a radiant electromagnetic beam 18 in the manner of a resonant circuit to absorb energy from the beam.

For recording the microwave beam, the magnetically "tuned" region or frame of the tape 10 is then directly exposed to a polarized beam 18 of the microwave signal, which beam 18 may be introduced by a waveguide or the like (not shown) and directed to uniformly illuminate the frame or region on the tape. The polarization of the microwave beam 18 is controlled such that its H component is made transverse to that of the static magnetic field 15 to exert a reaction torque on the dipoles in the resonant material layer 12. Upon exposure to the microwave beam 18, the resonant material 12 in the region or frame exposed to the beam absorbs energy from the beam and reradiates this energy in the form of heat thereby to raise the temperature of the absorbing resonant material 12.

Thus in the manner described, the microwave energy is absorbed and converted by the resonant layer 12 into a spatial heat pattern across the tape 10 in the region or frame exposed to the beam. This heat pattern, being in contact with the upper layer 13 of thermoplastic material, is therefore applied to the thermoplastic layer in the same pattern configuration thereby serving to raise the temperature of discrete positions over the thermoplastic surface above the critical temperature thereof.

For converting this heat pattern into a permanent or semi-permanent surface image on the plastic, the plastic material layer 13 may, in one preferred form thereof, be of a material having a relatively low heat of fusion and having a relatively narrow or critical temperature range at which the material changes from a solid to a plastic or liquid form. According to the invention, a material having these characteristics is provided with a dull or roughened upper surface finish 14 as is generally indicated in FIG. 2, which may be obtained by serrating, scraping, or otherwise roughening the upper surface of the layer 13. Upon the application of the heat pattern thereto, the temperature of those different positions or areas over the surface 14 receiving the heat image are raised above the critical temperature to melt or fuse the material at those discrete positions whereas the remaining surface areas of the plastic layer 13 are not sufficiently heated to this condition. This fusing of the material renders the upper surface of the plastic smooth and glassy at those heated areas, as is generally indicated in FIG. 1 at 40, thereby providing the upper surface of the tape with an alternate surface configuration of smooth and dull or roughened areas over the plastic layer 13 corresponding to the pattern of the heat image applied thereto. After cooling of the heated areas on the tape, this image pattern over the surface of the plastic is retained or frozen by the rehardening of the plastic thereby to provide a deformed surface configuration corresponding to the pattern of the microwave beam 18.

One thermoplastic material providing the characteristics desired for practicing the invention is a wax composition material sold by the Tempil Corporation of New York, N.Y., under the name "Tempilag." This material is obtainable in liquid form and when applied as a thin coating 13, it dries with a dull or frosty upper surface finish 14. Upon heating this wax to its critical temperature, the surface of the material becomes glassy and smooth in the regions heated, and upon cooling and rehardening thereof, it retains this smooth surface, clearly indicating the regions or areas that were previously heated. This wax material is also desirable in possessing a relatively low heat of fusion and in abruptly changing from a solid to a liquid or partially liquid state within a narrow critical temperature range. As discussed above, these features are desirable since the low heat of fusion renders this plastic material more sensitive to weaker heat patterns, and the abrupt temperature range of melting enables the rough-smooth surface pattern to be obtained with greater definition. However, as generally indicated above, a wide variety of other thermoplastic materials may be employed in practicing the invention including other waxes, both natural and synthetic resins, and various ones of the gels.

Among the other known materials having narrow critical temperature ranges are phenyl salicylate, biphenyl, diphenyl, para-toluidine, and p-bromo aniline.

FIG. 2 generally illustrates the manner of obtaining the recorded image as a dispersed frequency spectrum of the radiant beam 18. As shown, this effect is provided by supplying a nonuniform magnetic field 15 transversely across the tape 10 by such means as providing magnetic poles 16 and 17 with progressively diverging pole faces disposed in a direction across the tape 10. At the right, where the pole faces are positioned more closely together, the magnetic field being produced through the tape is at the strongest intensity, whereas at the left where the pole faces are disposed furthest apart, the magnetic field being produced through the tape is at the weakest intensity. In the region in between, the magnetic field accordingly becomes progressively weaker from right to left, thereby to provide a uniformly varying field across the tape having a different intensity at each transverse position.

As is described more fully in the copending applications discussed above, the spin resonance materials employed in the layer or impregnation 12 are frequency sensitive and absorb energy from the radiant beam 18 only at a frequency related to the intensity of the static magnetic field 15 to which they are subjected. In other words, such materials may be "tuned" by the magnetic field to respond to different frequencies. Accordingly, by providing a nonuniform magnetic field transversely across the tape, each different transverse position on the tape is tuned to respond only to a different frequency in the beam 18 and each position is effectively transparent to other frequencies. Thus, upon illuminating all positions in the frame with the radiant beam 18, each different frequency component in the beam 18 is absorbed at a different transverse position across the tape to provide a spectral frequency image of the beam 18.

FIGS. 3 and 4 illustrate a second preferred embodiment and method of practicing the invention. In this embodiment, the recording tape 20 may be essentially the same as in FIGS. 1 and 2 and comprise a base or support layer 21, an intermediate layer 22 of dispersed spin resonance material, and an upper thin layer 23 of a suitable wax or other deformable thermoplastic material, such as a silicone gel or the like.

The radiant microwave beam 18 may be converted into a spatial heat pattern image on the tape 20 in the same manner as described above by subjecting a frame or image region on the tape to an intense magnetic field 15 to presensitize or tune the spin resonance layer 22 to the frequencies to be recorded and simultaneously subjecting this tuned region to the radiant microwave beam 18, being directed over a coaxial cable 25 and through a waveguide recording head 24 to uniformly illuminate the complete frame. The heat image being obtained in the resonant layer 22 is applied directly to the upper plastic layer 23 to provide a pattern of heat softened areas or positions on the tape 20 corresponding to the radiant beam.

To develop this heat image into a deformed surface pattern according to the second embodiment, the tape 20 is then removed from the radiant beam recording zone and is positioned under a source of negatively charged electrons 26 where the upper surface of the plastic layer 23 is uniformly sprayed or wiped with electrical charges 31 as generally indicated in FIG. 2. After receiving the layer of charges, the tape 20 is next passed through a high intensity electrostatic direct current field, such as may be obtained from a flat plate 27 and a lower rod 28 positioned at opposite sides of the tape and energized by a high voltage direct current source 29. The positive terminal of this field is located at the rod 28 below the tape thereby to exert a downward force on the electrons 31 disposed over the upper surface of the tape. Where the tape has been heat softened by the recording heat pattern, the downward force exerted upon the electrons 31 by the electrostatic field succeeds in pushing aside or deforming the surfaces of the tape to provide a visible pattern of indentations thereon as generally indicated at 32, whereas those positions on the plastic layer that have not been heated and softened by the heat pattern resist the downward pull on the electrons 31 to maintain their previous surface finish.

Thus, according to the second embodiment of the invention, the heat pattern being obtained from the radiant beam produces a pattern of heat softened positions in the plastic corresponding to the frequencies of the radiant beam 18 and the application of a uniform stress over the surface of the material by means of the electrostatic field operates to distort or deform the surface regions that have been previously softened to produce a very pronounced deformation pattern or physical image over the surface of the plastic corresponding to the intelligence of the microwave beam.

After the recording of the beam has been completed, the tape 20 is then cooled to solidify or freeze the deformed image pattern in the plastic thereby to provide a permanent or semi-permanent image as is desired.

In performing the steps of applying the uniform electric field to stress the plastic layer 23 as described, it is preferred that the upper surface of the plastic layer 23 first be sprayed or wiped with a negatively charged layer of electrons 31 from a suitable source 26, as described, and that thereafter the plastic member be subjected to a high intensity transverse electric field by means of the capacitor plate 27 and rod 28. However, the step of negatively charging the surface of the plastic is not essential to deforming the plastic layer 23 and the application of a sufficiently strong electric field being applied between the plate 27 and the rod 28 or by a pair of plates will, by itself, deform the heat softened areas on the thermoplastic material 23 in the manner described.

As generally indicated above, the cooling and consequent rehardening of the heat softened areas on the plastic layer 23 serves to freeze and permanently retain the deformed pattern or image in the plastic. However, if it is desired to erase this pattern and restore the plastic layer to its blank or undeformed condition, this may be easily performed by uniformly heating the entire recording member so that the plastic flows to fill in the cavities, undulations, wrinkles and the like 32, forming the deformed surface pattern. If desired, the further step of combing or leveling the upper surface of the flowable plastic layer 23 may also be practiced to insure a uniform and level upper surface. Alternatively, a large number of thermoplastic materials are known that possess a "plastic memory" and will return to their original shape and configuration upon the application of heat. By using these known materials, the embossed or deformed surface pattern may be erased by applying sufficient heat to the recording tape to enable the plastic layer 23 to return to its original condition.

Although in the process steps as described above, the heat pattern is first applied to the plastic layer 23 and thereafter the electrical stressing force is uniformly applied to deform the heat softened areas, it is believed evident that these steps may be reversed in time. By reversing the steps, the plastic layer 23 may be first subjected to a uniform electric stressing field that is normally insufficient to deform the hardened plastic but is sufficient to deform the plastic after it has been heat softened by the heat image. The result is, therefore, the same since the plastic layer 23 will be deformed in the pattern of the heat image.

The intensity of the electric field and/or the magnitude of the electrical charges 31 applied to the thermoplastic may also be varied as desired, as may be the thickness of the layer 23 of the thermoplastic material being employed. With regard to the thermoplastic materials, a wide variety of dielectric thermoplastics are suitable for this embodiment such as various of the waxes, the natural and synthetic resins, and various gelatinous materials, such as those formed of silicone oil.

Briefly considering the phenomena of spin resonance and some preferred materials that may be employed in the spin resonance layer or impregnation, it is known that in certain materials, such as in free radical materials, and certain crystals, numerous uncoupled or unpaired particles, such as electrons, may exist or be created. These unpaired particles endlessly spin in orbits within the materials when subjected to an external magnetic field and the rate of spin or spin speeds of the particles are known to be controlled by and proportional to the intensity of the externally applied magnetic field. As a result of being charged electrical particles that are continuously moving or orbiting, these particles will respond to external radiant radio beams in the microwave frequency. In responding to the radio beams, the orbiting particles behave in the manner of a resonant circuit with the resonant frequency at which they respond to absorb energy from the beam being a function of the spin rate of the particles which, in turn, is controlled by the intensity of the external magnetic field to which the particles are subjected. The energy being absorbed by the orbiting particles is converted into heat by essentially two methods. In the first, the spinning electrons or other particles collide with surrounding particles to give off heat, and this phenomena is termed spin-lattice relaxation effects. Secondly, the spinning particles emit energy in the form of electromagnetic waves which are received and absorbed by other matter in the material. This latter effect is termed spin-spin relaxation effects.

According to the present invention, the free radical materials are preferred for use in the layer 12 of FIGS. 1 and 2 or 22 in FIGS. 3 and 4 and one suitable material of this type which is obtainable in stable form is the material diphenylpicrylhydrazyl (DPPH). This material is a free radical material possessing numerous unpaired electrons and is stable at ambient temperatures. It is obtainable in small grain solid particle form whereby layers, coatings, or impregnations thereof may be easily applied to the Mylar or other base tape in the manner described. However, as discussed in much greater detail in the co-pending applications listed above, numerous other crystal materials, free radical materials, and others possessing these characteristics may be employed in practicing the invention.

Although but two preferred processes and apparatus have been illustrated and described, it is believed evident that many changes and variations in the process steps and in the materials employed may be made without departing from the spirit and scope of this invention. Accordingly, this invention is to be considered as being limited only according to the following claims appended hereto.

What is claimed is:

1. A recording member for providing a surface deformation pattern of a microwave signal comprising a base member, a layer of spin resonance material supported by said base member and characterized by possessing numerous unpaired subatomic charged particles therein, and a layer of thermoplastic material combined with said base member and said spin resonant layer and in heat conducting relationship therewith, and characterized by responding to heat in the spin resonant layer to provide a change in the physical shape of the surface of the thermoplastic material corresponding to the heated areas.

2. In the recording member of claim 1, said layer of spin resonance material comprising a free radical containing material.

3. In the recording member of claim 1, said thermoplastic material being characterized by possessing a critical narrow range of temperature at which the material undergoes a change of state.

4. In the recording member of claim 3, said thermoplastic material having an uneven surface finish whereby a temperature produced change of state therein varies the surface configuration of said material.

5. A recording member for radiant radio beams comprising a support means, a layer of material containing free radicals supported by said means, and a layer of dielectric thermoplastic material dispersed intimately with said free radical material on said support means and responsive to a critical change in temperature to change the physical shape of its surface in a deformation pattern indicating the heated areas.

6. In the recording member of claim 5, said support means comprising a base layer, said free radical material comprising an intermediate layer supported on the base and thermoplastic material comprising an upper layer.

7. A process for forming a radiant radio beam recording member comprising the steps of dispersing a mass of microwave spin resonant material over an extended region of a base support and applying thereover a liquid coating of thermoplastic material being characterized by solidifying with a dull surface finish, possessing a low heat of fusion, responding to a critical change of temperature to change from a solid to a liquid state, and re-solidifying after such change of state to a smooth surface finish.

References Cited

UNITED STATES PATENTS

| | | | |
|---|---|---|---|
| 3,118,787 | 1/1964 | Katchman | 340—173 |
| 3,134,093 | 5/1964 | Anderson | 340—173 |
| 3,152,321 | 10/1964 | Peltzer | 340—173 |
| 3,243,784 | 3/1966 | Anderson | 340—173 |

TERRELL W. FEARS, *Primary Examiner.*